Figure 9:
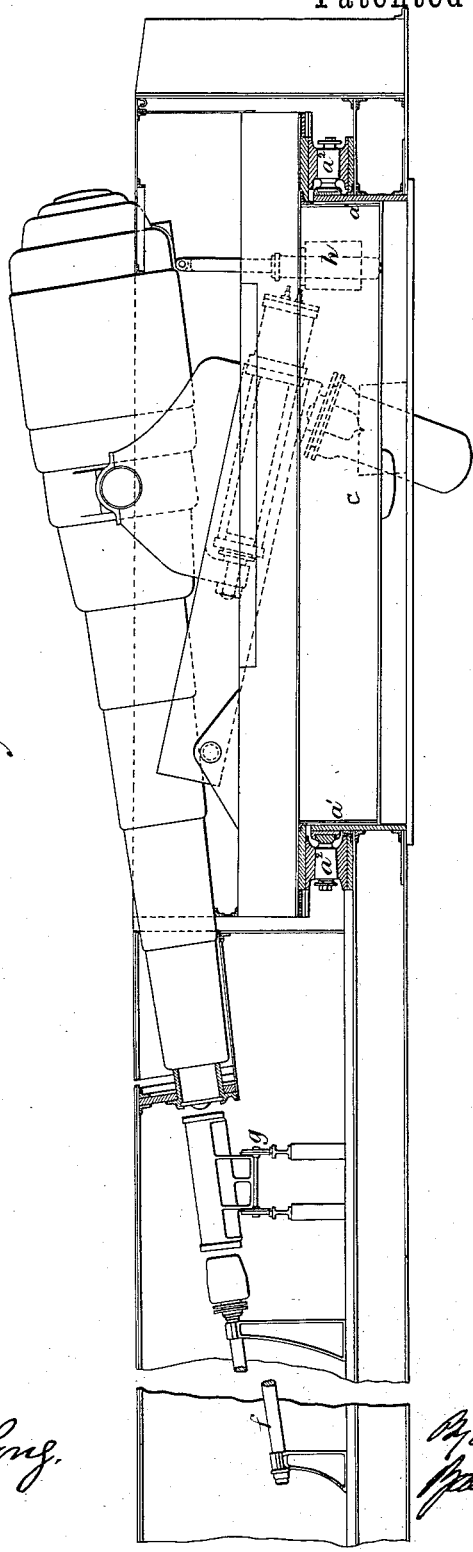

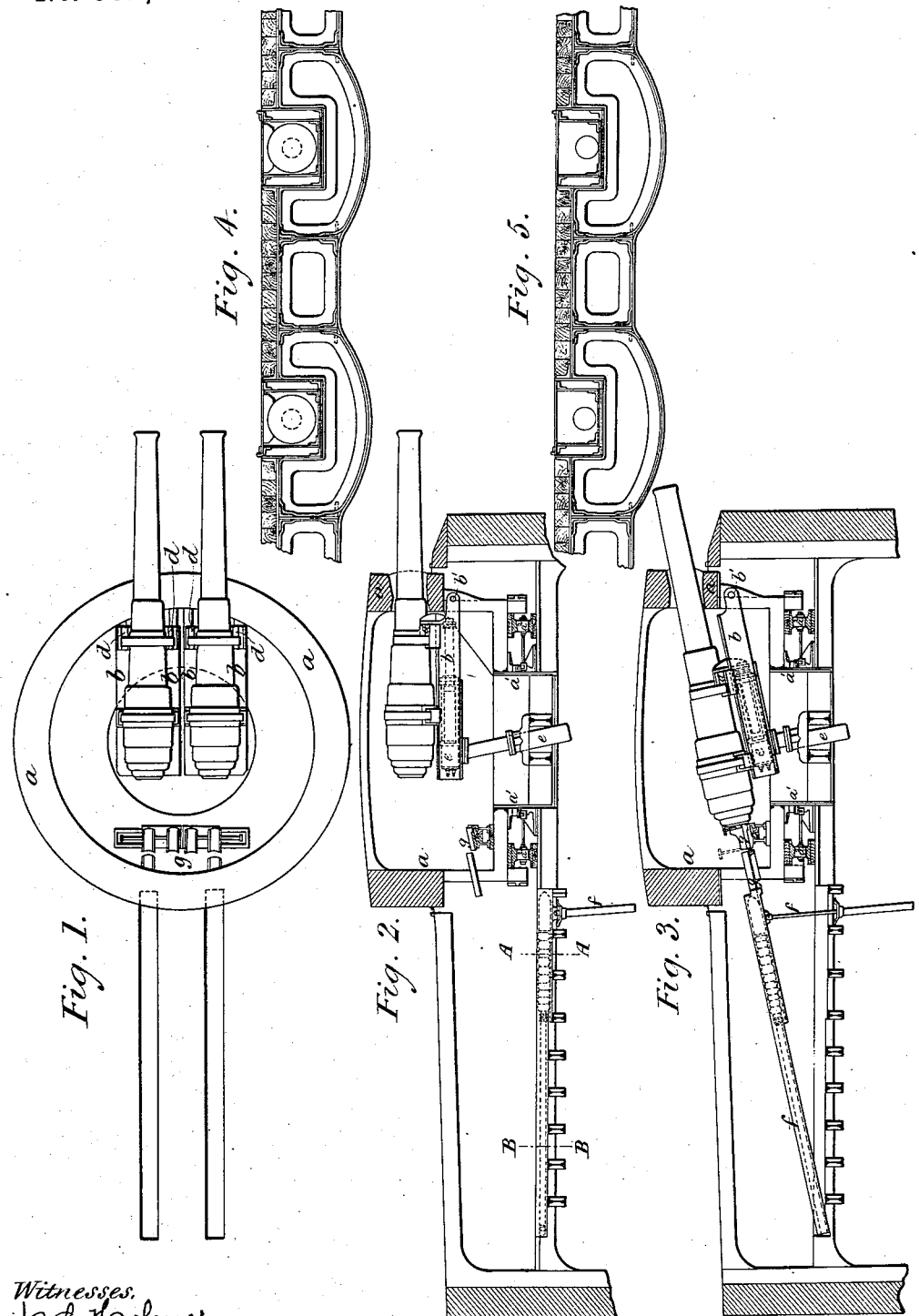

(No Model.) 8 Sheets—Sheet 2.
G. W. RENDEL.
MECHANISM FOR OPERATING ORDNANCE.
No. 392,754. Patented Nov. 13, 1888.
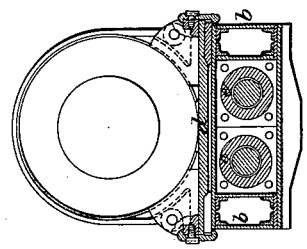
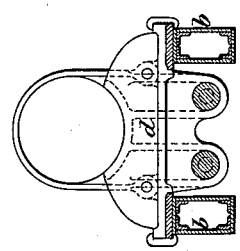
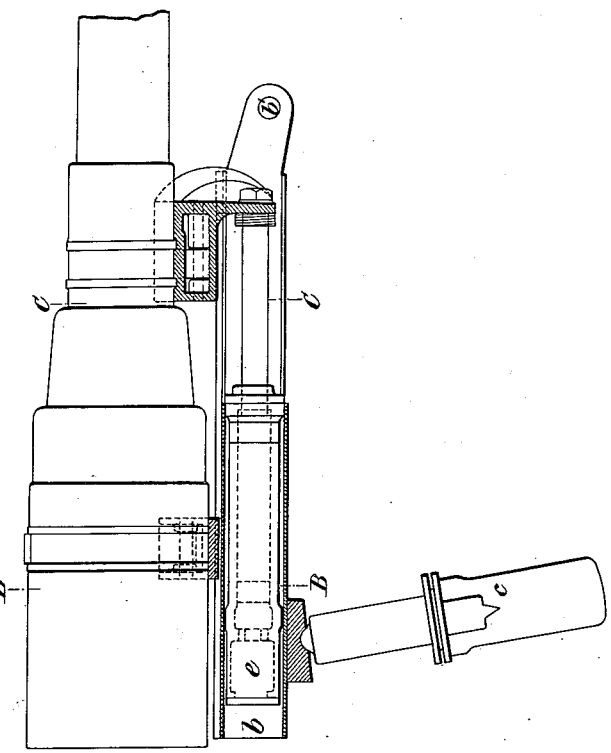
Witnesses.
Inventor, (No Model.) 8 Sheets—Sheet 3.

G. W. RENDEL.
MECHANISM FOR OPERATING ORDNANCE.

No. 392,754. Patented Nov. 13, 1888.

Witnesses,
Inventor.

(No Model.) 8 Sheets—Sheet 4.

G. W. RENDEL.
MECHANISM FOR OPERATING ORDNANCE.

No. 392,754. Patented Nov. 13, 1888.

Witnesses: Inventor:

(No Model.) G. W. RENDEL. 8 Sheets—Sheet 5.
MECHANISM FOR OPERATING ORDNANCE.
No. 392,754. Patented Nov. 13, 1888.

Witnesses: Inventor, (No Model.) 8 Sheets—Sheet 6.

G. W. RENDEL.
MECHANISM FOR OPERATING ORDNANCE.

No. 392,754. Patented Nov. 13, 1888.

Witnesses,
Inventor, (No Model.)
8 Sheets—Sheet 7.

G. W. RENDEL.
MECHANISM FOR OPERATING ORDNANCE.

No. 392,754.
Patented Nov. 13, 1888.

Witnesses.
N. L. Holmes
Baltus De Long

Inventor,
G. W. Rendel,
By attys
Baldwin, Hopkins & Payton (No Model.) 8 Sheets—Sheet 8.
G. W. RENDEL.
MECHANISM FOR OPERATING ORDNANCE.
No. 392,754. Patented Nov. 13, 1888.

Witnesses, Inventor,

UNITED STATES PATENT OFFICE.

GEORGE WIGHTWICK RENDEL, OF NEWCASTLE-UPON-TYNE, ENGLAND.

MECHANISM FOR OPERATING ORDNANCE.

SPECIFICATION forming part of Letters Patent No. 392,754, dated November 13, 1888.

Application filed June 7, 1887. Serial No. 240,544. (No model.) Patented in England December 24, 1878, No. 5,264.

*To all whom it may concern:*

Be it known that I, GEORGE WIGHTWICK RENDEL, a subject of the Queen of Great Britain, residing at Newcastle-on-Tyne, England, civil engineer, have invented certain new and useful Improvements in Apparatus for Mounting and Working Guns, (for which a patent has been obtained in Great Britain, dated December 24, 1878, No. 5,264,) of which the following is a specification.

The invention has reference to the mode of mounting guns whether loaded at the breech or muzzle.

I fix the gun on a saddle answering to the carriage in ordinary use and arranged like it to recoil and move backward and forward on a slide or platform; but instead of giving elevation—*i. e.*, angular motion in a vertical plane—to the gun by resting and inclining the gun on trunnions in bearings on the saddle, I fix the gun to the saddle with or without trunnions and incline the slide with gun and saddle all together about a horizontal pivot in the slide. I give horizontal movement to the gun by mounting the slide on a turn-table or on a platform pivoted vertically or in a turret. I control the motion of the saddle on the slide during recoil and move it backward and forward at will by water-pressure. When mounted in this manner, the gun may be made muzzle or, more properly, port pivoting, by placing the pivot of the slide close underneath the port, as in a casemate or in a turret, and thus the dimensions of the port may be reduced to little more than the size of the gun where it passes through, so that the gun closes the port. I raise and lower the slide about the horizontal pivot by means of a hydraulic press, or I may use screws or other suitable mechanism.

The invention also has reference to the mechanism for closing the breech in breech-loading guns. Having the gun fixed immovably to a saddle, I attach to the saddle, instead of to the gun, the fittings required to receive the breech screw or wedge, together with mechanism adapted to remove and replace the screw or wedge and to bring up and remove the loading-tube. Hitherto such mechanism has always been fitted on the gun, and has been limited in convenience and ease of working by the difficulty of attaching much apparatus on the gun and the want of space for the purpose. On this system the mechanism may be extended to any necessary amount to adapt it either to be worked by hand or by other power, such as that of water-pressure. In some cases I prefer to fix the mechanism on the slide or on the revolving platform and to bring the gun up to it in position for opening and closing the breech, the object being still to relieve the gun of the breech mechanism and to place this independently where there is plenty of space to fit and work it, and facility for applying power other than manual power to work it.

In the case of breech-loading guns on the interrupted screw or French system, I apply the power to remove and replace the screw as follows: Having turned the screw by hand, by means of a lever or otherwise, until it is free to come out, I withdraw it from the gun by means of a small fixed press onto a table, which carries, also, the loading-tube, and having the screw so withdrawn I traverse the table sidewise by means of another press until the screw is clear of the loading-gear and the loading-tube brought into position; or I apply screws or toothed gear with racks to effect the same motions.

When the breech mechanism is fixed on the saddle, it is and remains always in position to act; but when fixed on the slide or platform it is only in position to act when the breech of the gun is brought up to it and in proper line, which is effected by the movement of the gun on the slide and by the vertical movement of the slide itself.

Breech-loading guns I may load upon the system of my English Patent No. 3,826 in the year 1872, giving the gun the necessary angle to introduce the charge from below the deck by lowering the breech and giving the gun elevation instead of by depressing the muzzle, as in the case of guns loaded at the muzzle on this system.

In order that my invention may be most fully understood and readily carried into effect, I will proceed to describe the drawings hereunto annexed.

Figure 10:
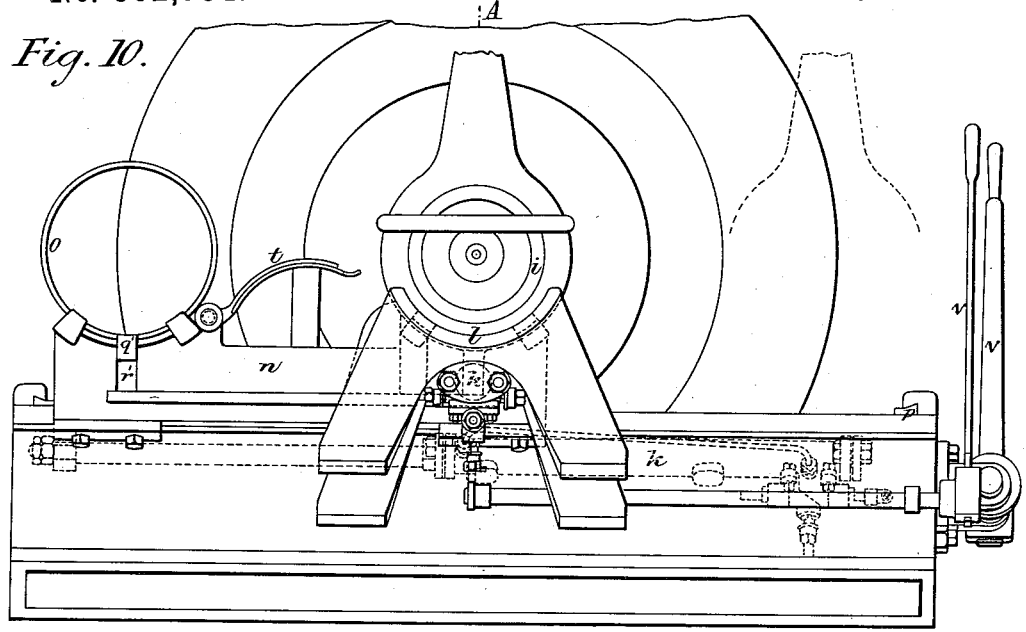
Figure 12:
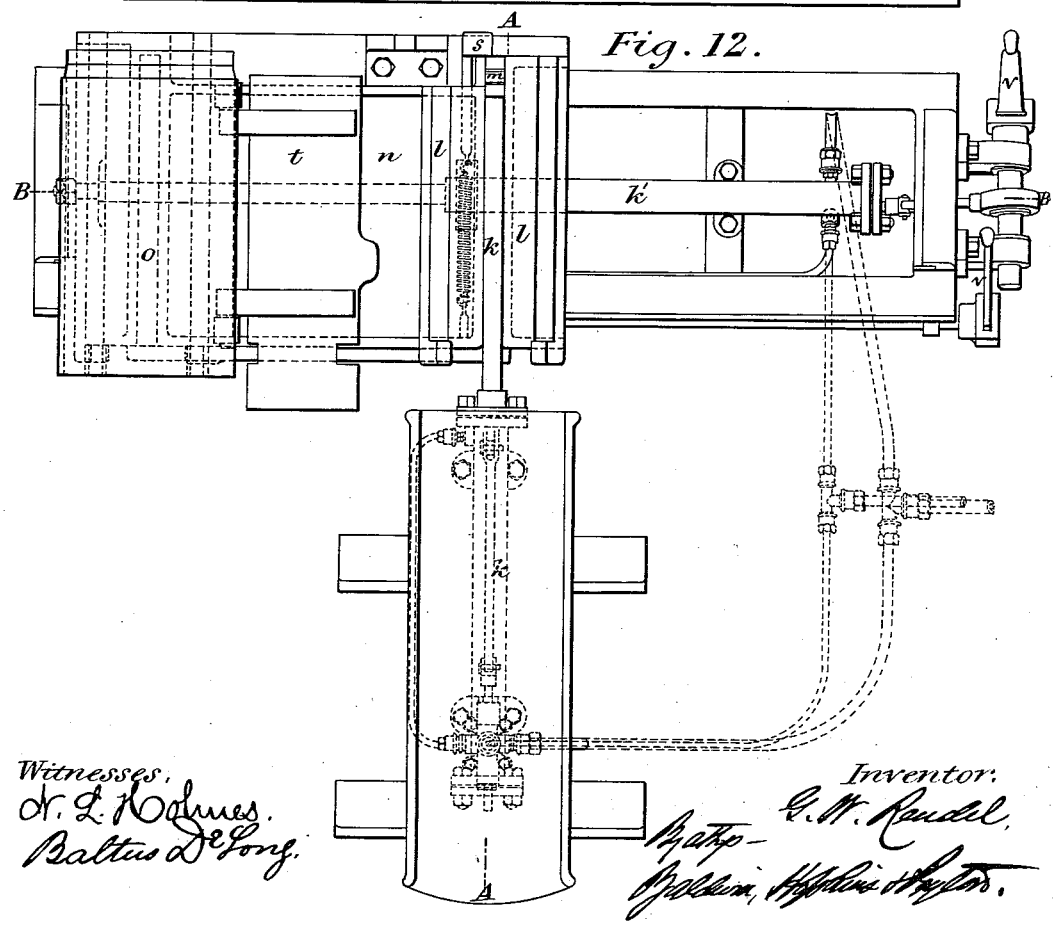
Figure 11:
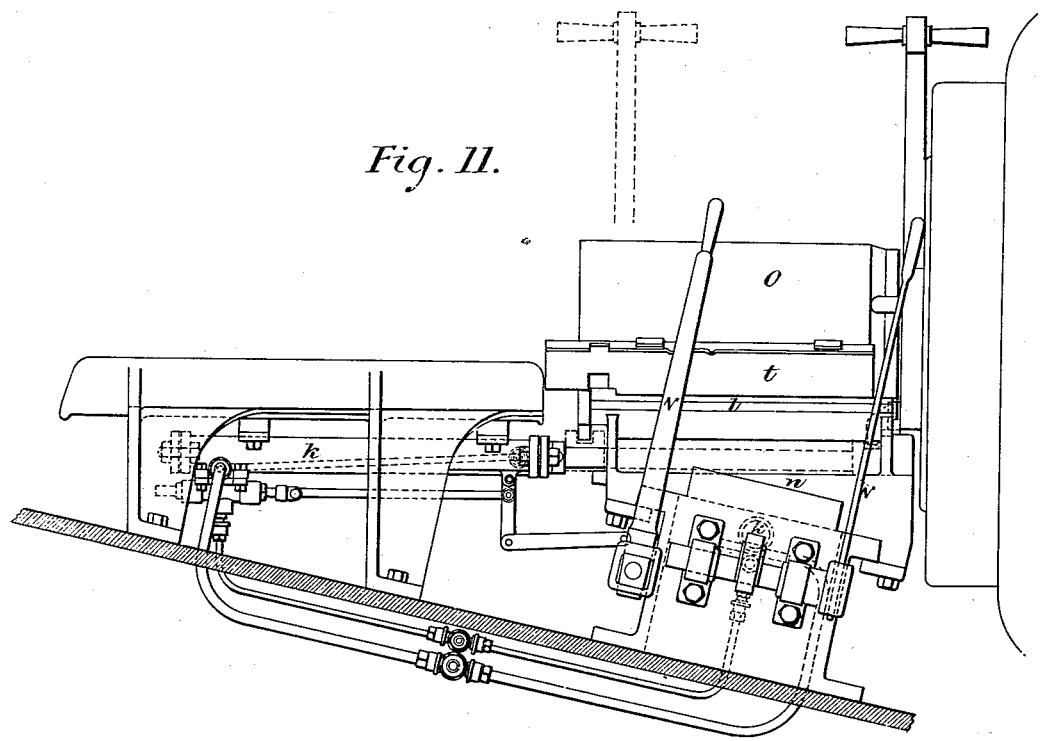
Figure 13:
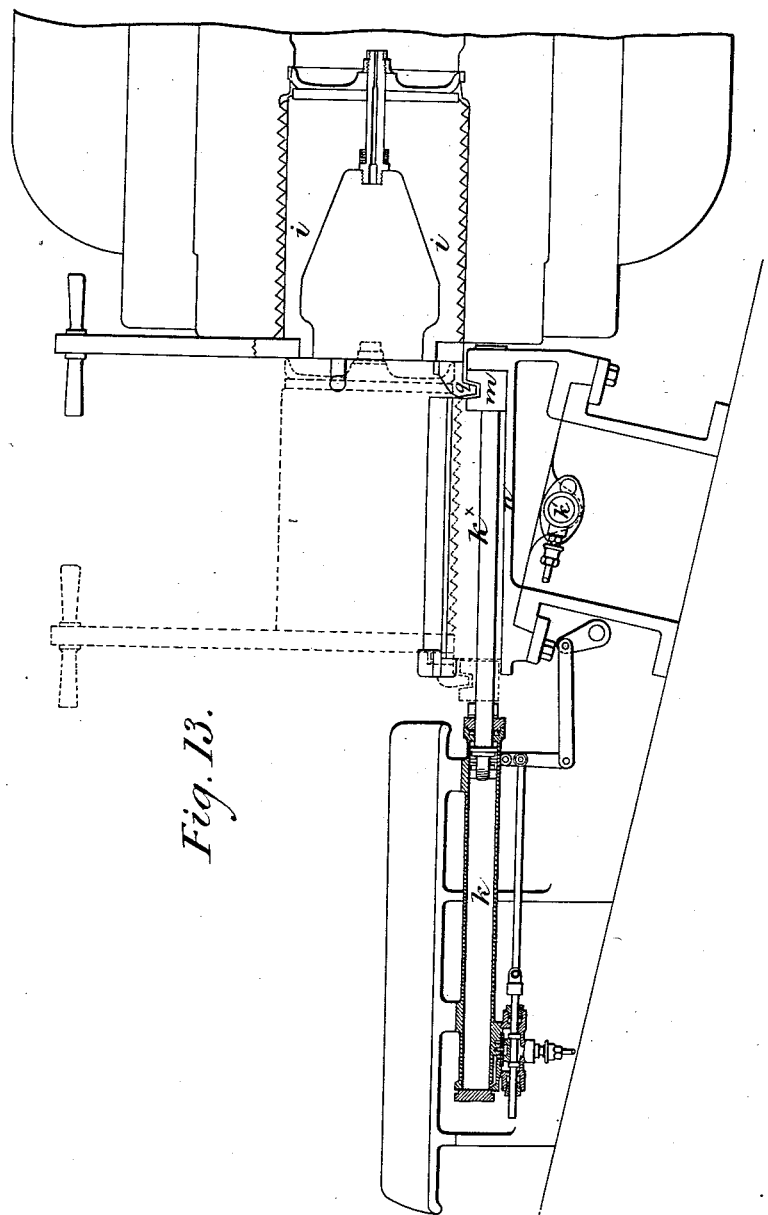
Figure 14:
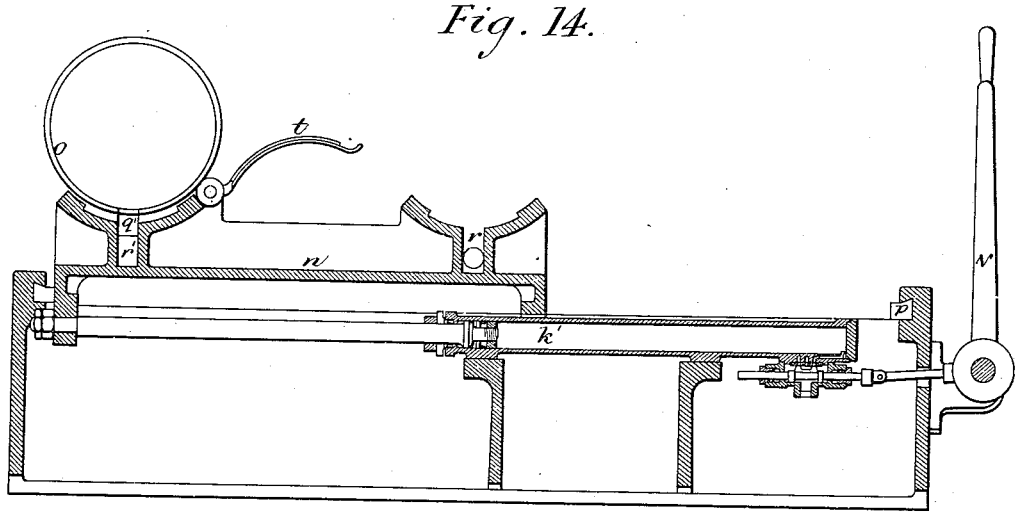
Figure 15:
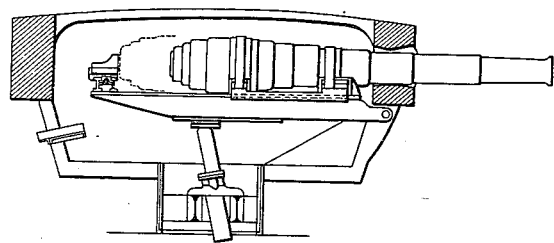
Figure 16:
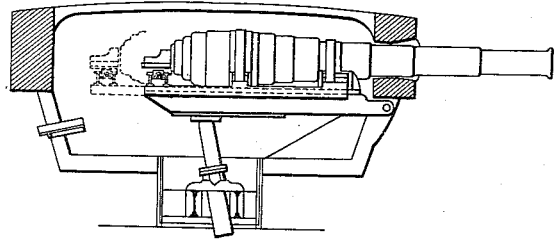

In the accompanying drawings, Figure 1 is a plan of the guns and mechanism for operating the same. Fig. 2 is a vertical section showing one of the guns in the firing position. Fig. 3 is a vertical section with one of the guns shown in the loading position. Fig. 4 is a transverse section, on a larger scale, on the line A A of Fig. 2. Fig. 5 is a transverse section, on a larger scale, on the line B B of Fig. 2. Fig. 6 is a side view, partly in section, of the gun and its framing. Fig. 7 is a transverse section on the line B B of Fig. 6. Fig. 8 is a transverse section on the line C C of Fig. 6. Fig. 9 is a side elevation, partly in section, of a muzzle-loading gun mounted in its framing upon a turn-table. Fig. 10 is a back elevation of a breech-loading gun and its frame embodying my invention. Fig. 11 is a side elevation of the same. Fig. 12 is a plan view of the mechanism for elevating the gun. Fig. 13 is a section on the line A A in Figs. 10 and 12. Fig. 14 is a section on the line B B of Fig. 12. Fig. 15 is a side elevation, with the frame in section, showing the apparatus for manipulating the breech-block and loading-tube mounted on a slide; and Fig. 16 is a similar view showing said apparatus mounted on a saddle.

The drawings in Figs. 1 to 5, inclusive, show a pair of heavy guns mounted according to my invention in a turret and upon pivoted slides, which can be raised and lowered to give the required elevation to the guns. The same drawings also show the mechanism for receiving the breech-blocks and to remove and replace them, and to bring up, place, and remove the loading-tubes. This mechanism is here shown fixed upon the floor or platform of the revolving turret. These drawings also represent my combined hydraulic shot hoists and rammers arranged to raise the charges to and to pass them into the open breeches of the guns.

$a\ a$ is the turret. It is capable of being turned by mechanism about the hollow cylindrical pivot $a'$, and it runs upon rollers $a^2$.

$b$ is the gun-slide. It is jointed at its front end to the turret $a$ at $b'$ immediately beneath the port in the turret, and it is supported at the back by the ram of the centrally-placed hydraulic press, $c$.

$d$ is a saddle capable of traversing along the slide $b$, under the control of the hydraulic cylinders $e$. These parts are shown to a larger scale and more in detail by the Figs. 6, 7, and 8. The hydraulic press $c$, it will be seen, is arranged to rock upon knife-edges. Its connections are made by means of copper tubes, which are so curved as to afford the requisite flexibility. The presses $e\ e$ are supplied in a similar manner. The valves employed are of well-known construction.

Returning to Figs. 2 and 3, $f\ f$ represent my combined shot lift and rammer. It is to some extent similar to loading apparatus which I have employed in connection, especially, with muzzle-loading guns. It consists of a trough jointed at one end to a deck or stationary platform, and the trough descends, when not in use, below the level of the deck or platform, leaving a flush surface without inconvenient projections. The trough carries a ramrod, which can be thrust forward when required by means of a hydraulic press. Another press serves to raise the free end of the trough and to bring the trough into alignment with the bore of the gun when in the loading position. There is also space provided upon the trough in front of the rammer for the cartridge and projectile, which, having been previously placed, are carried up by the trough into position to enter the breech of the gun, and when the rammer is made to advance they are thrust by it into their places in the gun. Between this ramming-gear, however, and the breech of the gun it is necessary to provide mechanism for manipulating the breech-block and the loading-tube. This mechanism is seen at $g\ g$. It is here fixed upon the floor or platform of the revolving turret. I will defer for the present the detailed description of the mechanism $g$.

In Fig. 9 there is shown a muzzle-loading gun mounted, in accordance with my invention, upon a turn-table. The arrangement is very similar to that shown in Figs. 1, 2, and 3, and the parts are lettered to correspond with the description already given; but for the more convenient arrangement of the loading mechanism the gun is not clipped fast to the saddle, but is carried upon it by trunnions. During aiming and firing the gun lies on the saddle, the breech preponderating; but for loading while the slide remains down the breech of the gun is elevated by a press, $h$, provided for the purpose. Thus the muzzle is brought to such a position that the charge can be thrust into the gun by the hydraulic ramming apparatus, which the drawings show. In Fig. 9 the gun-slide is elevated by press $c$. A trolley is also shown to carry the charge from the service-magazine to the loading point. After loading, the breech of the gun is allowed to descend, and the muzzle rises to a position which permits the turn-table to be rotated. The aiming is effected by this rotation and by the inclining of the slide on its horizontal pivot. The turn-table, with the apparatus and gun upon it, is protected by a shot-proof belt, which affords complete shelter to the mechanism and a large amount of shelter to the gun itself. As respects this part of my invention, I would remark that it has before been proposed to mount guns on slides (or equivalent parts) capable of being inclined about horizontal pivots to give elevation to the gun. Consequently to this I make no claim; but in the prior arrangements to which I refer the slides have been also movable (apart from the structure or platform on which the gun is carried) about a vertical pivot, and in this way the training motion has been obtained. I, as will have been seen, obtain the training movement by the rotation of a turret or structure within which the gun is contained, or of a turn-table upon which it is supported; and I wish it to be understood that I make no claim in respect to the manner of mounting guns upon saddles sliding on horizontally-pivoted slides, except in connection with turret or urn-table guns.

Figs. 10 to 14, inclusive, show the mechanism which I employ in connection with breech-loading guns on the interrupted-screw or French system to remove, receive, and replace the screw or breech-block, and to bring up, place, and remove the loading-tube. $i$ is the breech-screw, with its lever attached. $k$ is a press, by means of which the breech-screw $i$ is withdrawn onto the table $l$. The press operates by means of a claw, $m$, at the head of the piston-rod $k^x$. (Best seen in Fig. 13.) When the breech-screw has been turned by hand ready for removal from the gun, a projecting tongue, $q$, upon its outer edge engages with the claw $m$, and the press $k$ being then made to operate, the screw is withdrawn and landed onto the table $l$. The table $l$ is upon a saddle, $n$, which, by means of a press, $k'$, can be caused to traverse along guides transversely to and in rear of the gun. By this means the breech-screw is moved away, and at the same time the loading-tube $o$ is brought into position, the saddle coming to rest against a stop, $p$. In this position the loading-tube $o$ is in a line with the bore, and its tongue $q'$ has engaged with the claw $m$. The groove $r'$ in the saddle has also come opposite the press $k$, and the press being made to operate, its piston-rod enters the guideway formed by the saddle-groove $r'$ and acts to force the loading-tube home into the breech of the gun to cover the screw-thread in the breech. $s$ is a stop which guards the entrance to the groove $r$ in the saddle, and until it is displaced the breech-screw cannot be turned sufficiently far round to free it from the gun, the tongue $q$ coming against the stop $s$. When the piston-rod of the press $k$ advances, it pushes the stop $s$ in front of it, thus taking it out of the way, and its place is taken by the notch in the claw $m$, which the tongue $q$ is able freely to enter. The stop $s$ is carried upon a stem, which is received into a hole or socket in the saddle $n$, and there is a spring which holds the stop in position until it is displaced in the manner already described. When the claw retires, it brings back the loading-tube and the spring brings back the stop. The piston-rod of the press $k$, by entering the grooves $r$ and $r'$ in the saddle, locks it fast and prevents movement at improper times. $t$ is a flap, which, when the loading-tube has been passed into the gun, is turned over, so that it may serve both to lock the loading-tube in position and also to conduct the charge from the trough of the ramming apparatus into the loading-tube $o$, from which it passes on into the chamber of the gun. $v\,v$ are the levers actuating the valves by which the hydraulic pressure is admitted to the presses $k\,k'$ at either end at the time required. This apparatus for manipulating the breech-block and loading-tube may be mounted upon the turret or turn-table, as is represented in Figs. 1, 2, and 3; or it may be mounted upon the slide, as is represented at Fig. 15; or it may be mounted on the saddle, as is represented by Fig. 16.

Having thus described the nature of my said invention and the manner of performing the same, I would have it understood that I claim—

1. The combination of a horizontally-turning turret or turn-table, a gun-slide jointed thereto at its fore end by a pivot, allowing vertical movement at its rear end, and a sliding saddle carrying the gun and wholly supported by the gun-slide along which the saddle moves only in the line of recoil, substantially as and for the purpose set forth.

2. The combination of a horizontally-turning pivot or turn-table, a gun-slide jointed thereto at its fore end by a pivot, allowing vertical movement at its rear end, a sliding saddle carrying the gun and wholly supported by the gun-slide, along which the saddle moves only in the line of its recoil, and a press acting upon the gun-slide to move it vertically about its pivot, substantially as set forth.

3. The combination of a horizontally-turning turret or turn-table, a gun-slide attached thereto by a pivot at its fore end, allowing vertical movement at its rear end, a sliding saddle movable along the gun-slide in the line of recoil, the gun trunnioned in and resting at its breech upon the sliding saddle, a press acting upon the breech end of the gun to raise and lower it, and a press acting upon the gun-slide to move it vertically about its pivot, substantially as and for the purpose set forth.

4. The combination of the gun provided with the breech-block, the saddle traversing transversely to and in rear of the gun, the table upon the saddle to receive the breech-block, the loading-tube supported upon the saddle and movable transversely to the path of movement thereof, and the rod likewise movable transversely to the path of movement of the saddle and having the hook or claw for engagement with the breech-block and with the loading-tube, substantially as and for the purpose set forth.

5. The combination of the gun provided with the breech-block, the saddle traversing transversely to and in rear of the gun, the hydraulic press connected with the saddle and moving it to and fro, the table upon the saddle to receive the breech-block, the loading-tube supported upon the saddle and movable transversely to the path of movement thereof, and the hydraulic press with its rod movable transversely to the path of movement of the saddle and having the hook or claw for engagement with the breech-block and with the loading-tube, substantially as and for the purpose set forth.

GEORGE WIGHTWICK RENDEL.

Witnesses:
EDWARD CAMPHAUSEN,
FERDINAND BURNS.